United States Patent
Nakazono et al.

(10) Patent No.: US 7,900,600 B2
(45) Date of Patent: Mar. 8, 2011

(54) HOMOGENEOUS CHARGE COMPRESSED IGNITION ENGINE OPERATING METHOD

(75) Inventors: Tohru Nakazono, Osaka (JP); Hiroyuki Ohtsubo, Osaka (JP); Takayuki Shirouzu, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 12/439,045

(22) PCT Filed: Aug. 30, 2007

(86) PCT No.: PCT/JP2007/066888
§ 371 (c)(1),
(2), (4) Date: Feb. 26, 2009

(87) PCT Pub. No.: WO2008/026686
PCT Pub. Date: Mar. 6, 2008

(65) Prior Publication Data
US 2010/0012079 A1    Jan. 21, 2010

(30) Foreign Application Priority Data

Aug. 31, 2006 (JP) ................................ 2006-235967

(51) Int. Cl.
*F02P 5/06* (2006.01)
(52) U.S. Cl. ............................... 123/406.55; 123/406.23
(58) Field of Classification Search ............. 123/406.35, 123/406.52, 406.53, 406.55, 406.23
See application file for complete search history.

(56) References Cited

U.S. PATENT DOCUMENTS

| 6,293,246 | B1 | 9/2001 | Tanahashi et al. |
| 7,082,898 | B2* | 8/2006 | Kitamura et al. ............... 123/21 |
| 7,168,420 | B1* | 1/2007 | Yang ........................ 123/568.15 |
| 7,213,566 | B1* | 5/2007 | Jankovic ...................... 123/302 |
| 7,213,572 | B2* | 5/2007 | Yang ........................ 123/406.11 |
| 7,234,438 | B2* | 6/2007 | Yang ............................. 123/295 |
| 7,240,659 | B2* | 7/2007 | Yang ............................. 123/295 |

FOREIGN PATENT DOCUMENTS

| JP | 11-62589 A | 3/1999 |
| JP | 11-210539 A | 8/1999 |
| JP | 2001-289092 A | 10/2001 |
| JP | 2005-69097 A | 3/2005 |

OTHER PUBLICATIONS

International Search Report dated Oct. 16, 2007 with English translation (two (2) pages).

* cited by examiner

*Primary Examiner* — Hai H Huynh
(74) *Attorney, Agent, or Firm* — Crowell & Moring LLP

(57) ABSTRACT

An aspect of the invention provides a method for operating a workable homogeneous charge compressed ignition engine in which a compression ignition operation is performed by spark ignition to shorten a load input time and a load cutoff time. In the homogeneous charge compressed ignition engine operating method, a mixture gas is burned by compression ignition in a combustion chamber, and fuel and air are previously mixed to produce the mixture gas. The homogeneous charge compressed ignition engine includes a spark ignition device 53 which performs spark ignition to the mixture gas. A temperature controller 35 substantially keeps an intake air temperature of the mixture gas constant. A spark ignition operation, a spark-assist compression ignition operation in which spark ignition is supplementarily used, and a non-spark compression ignition operation in which the spark ignition is not used are switched according to magnitude of a load.

6 Claims, 14 Drawing Sheets

(A)

(B)

HOMOGENEOUS CHARGE COMPRESSED IGNITION ENGINE OPERATING METHOD

TECHNICAL FIELD

The present invention relates to a homogeneous charge compressed ignition (HCCI) engine operating method.

BACKGROUND ART

In this kind of engine, for example, Patent Document 1 discloses a homogeneous charge compressed ignition engine, wherein a mixture gas in which fuel and air are previously mixed is supplied to a combustion chamber in a cylinder to compress the mixture gas, thereby self-igniting the mixture gas. Patent Document 1 also discloses that a spark ignition operation (SI operation) is performed in engine starting in which a compression ignition operation is hardly performed.

The homogeneous charge compressed ignition engine has an advantage that thermal efficiency is high because operation can be performed at a compression ratio higher than that of a spark ignition type engine. Generation of NOx can also be restrained because a combustion temperature can be lowered. However, in the homogeneous charge compressed ignition engine, because the mixture gas is naturally ignited, it is extremely difficult to control ignition timing.

The compression ignition of the mixture gas heavily depends on an engine torque and an intake air temperature of the mixture gas. For example, FIG. 3 is a graph showing operation ranges where the spark ignition operation and the compression ignition operation can be performed in terms of a relationship between the engine torque and the intake air temperature of the mixture gas, the numeral Z1 designates an operation range where the general spark ignition operation (SI operation) can be performed, and the numeral Z3 designates an operation range where the compression ignition operation (HCCI operation) can be performed.

In FIG. 3, in order that the engine is started by the spark ignition operation to make a transition from the spark ignition operation to the compression ignition operation, it is necessary to raise the intake air temperature as shown by an arrow Y1. When an intake air temperature (T2) is raised to the operation range Z3 where the compression ignition operation can be performed, a load can be fed to increase the torque (power). However, in order to increase the torque, the compression ignition operation can be maintained as long as the intake air temperature is lowered again as shown by an arrow Y2. In order that the load is cut off to decrease the torque after the maximum load is applied, the compression ignition operation can be maintained as long as the intake air temperature is raised again.

Accordingly, it takes a long time to lower or raise the intake air temperature until the load is fed or the load is completely cut off since the intake air temperature is raised, which results in a problem in practical use.

In the conventional homogeneous charge compressed ignition engine, a fuel control valve (air/fuel valve) is adjusted according to the load while a throttle valve fully opened, and an engine speed is governed by changing a fuel concentration. Therefore, in the case where the feed or cutoff of the load is performed at the intake air temperature set as shown by the arrow Y3 of FIG. 3, the fuel concentration becomes weak during the low load in the governing in which the fuel control valve is used, which results in a problem in that self-ignition is not generated. Alternatively, there is a method in which the engine speed is governed by adjusting the throttle valve while the fuel control valve is kept constant. However, in such cases, the throttle is opened near a fully open state when the load is increased, and a mixture gas amount is hardly changed even if the throttle opening is varied, which results in a problem in that a speed control insufficiently functions.

Usually an exhaust gas catalyst is provided in an exhaust pipe of the engine in order to purify a hazardous component (air-pollution substance) contained in the exhaust gas. As can be seen from FIG. 12(B), the air-pollution substance (for example, CO) contained in the exhaust gas is properly purified by passing through the catalyst when the load is increased, while the air-pollution substance is not purified too much when the load is decreased. This is attributed to the fact that, as shown in FIG. 12(A), an exhaust gas temperature is lowered to insufficiently promote a chemical reaction for purifying the air-pollution substance when the load is decreased. Accordingly, it is necessary that the exhaust gas temperature be kept at a high level to properly purify the air-pollution substance even if the load is decreased.

Patent Document 1: Japanese Patent Publication Laid-Open No. 2005-69097

DISCLOSURE OF INVENTION

Problems to be Solved by the Invention

In view of the foregoing, an object of the invention is to provide a sufficiently-workable homogeneous charge compressed ignition engine operating method wherein the compression ignition operation in which the spark ignition is supplementarily used is performed between the spark ignition operation and the compression ignition operation to shorten the load input time and the load cutoff time.

Means for Solving the Problems

The present invention is a homogeneous charge compressed ignition engine operating method in which a mixture gas is burned by compression ignition in a combustion chamber, fuel and air being previously mixed to produce the mixture gas, wherein the homogeneous charge compressed ignition engine includes a spark ignition device which performs spark ignition to the mixture gas, a temperature controller substantially keeps an intake air temperature of the mixture gas constant, and a spark ignition operation, a spark-assist compression ignition operation, and a non-spark compression ignition operation are switched according to magnitude of a load, spark ignition being supplementarily used in the spark-assist compression ignition operation, the spark ignition being not used in the non-spark compression ignition operation.

Preferably the invention has the following configurations.

(1) In the spark-assist compression ignition operation, target compression ignition timing is previously set, a spark ignition timing map is previously provided, spark ignition timing at which the target compression ignition timing can be realized being recorded in the spark ignition timing map, the spark ignition is performed at the spark ignition timing after engine starting when the load is not more than a predetermined value, the spark ignition timing being selected from an operating condition by referring to the spark ignition timing map, and, when the load is not lower than the predetermined value, the target compression ignition timing and actual compression ignition timing are compared to each other, and the spark ignition timing is adjusted based on the comparison such that the actual compression ignition timing is matched with the target compression ignition timing.

(2) An air excess ratio is lowered to perform the spark ignition operation immediately after the engine is started from a cold state.

(3) In the configuration (2), an engine speed is raised to a rated speed or more such that engine power becomes rating, immediately after the engine is started from the cold state.

(4) Throttle valve opening is adjusted to maintain an engine speed in performing the spark-assist compression ignition operation and the non-spark compression ignition operation, and an air excess ratio is lowered according to the throttle valve opening when the throttle valve opening is not lower than a predetermined value.

(5) A catalyst is provided in an exhaust passage of the engine in order to purify a hazardous component contained in exhaust gas, and a mixture gas flow rate is decreased while an air excess ratio is lowered in order that an exhaust gas temperature is raised while an engine speed is maintained, when the engine is in a low load state, or when the exhaust gas temperature is lower than a predetermined value.

EFFECTS OF THE INVENTION

According to the invention, the utilization of the spark-assist compression ignition operation in which the spark ignition is supplementarily used can smoothly and shortly make the transition between the spark ignition operation and the compression ignition operation (non-spark compression ignition operation) according to the magnitude of the load while the intake air temperature is substantially kept constant. The operation range of the compression ignition can substantially be enlarged by performing the spark-assist compression ignition operation.

Accordingly, in the configuration (1), when the load is not lower than the predetermined value, feedback control is performed based on the comparison of the target compression ignition timing and actual compression ignition timing, which allows the spark ignition timing to be adjusted at proper timing. On the other hand, the actual compression ignition timing is hardly detected when the load is not more than the predetermined value, and the spark ignition timing is fluctuated to easily generate the knocking when the feedback control is performed. Therefore, the spark ignition can be performed more stably by performing the spark ignition at the timing selected from the spark ignition timing map.

Accordingly, in the configuration (2), the engine is quickly warmed from the cold state to the warm state, so that the intake air temperature can quickly be raised by utilizing the engine cooling water or other things and therefore the state in which the load is fed can be formed.

Accordingly, in the configuration (3), the engine is quickly warmed from the cold state to the warm state, so that the intake air temperature can quickly be raised to form the state in which the load is fed.

Accordingly, in the configuration (4), the engine speed can be governed by the throttle valve even if throttle valve opening becomes more than the predetermined value during the high load.

Accordingly, in the configuration (5), when the catalytic conversion performance can insufficiently be exerted due to the low exhaust gas temperature like the case of the low load operation, the exhaust gas temperature is raised while the engine speed is maintained, which allows the catalytic conversion efficiency to be enhanced.

EXPLANATIONS OF LETTERS OR NUMERALS

11 Homogeneous charge compressed ignition engine
13 Cylinder
14 Piston

31 Throttle valve
32 Fuel control valve
35 Temperature controller
45 Controller

BEST MODE FOR CARRYING OUT THE INVENTION

[Outline of Homogeneous Charge Compressed Ignition Engine]

Figure 1:
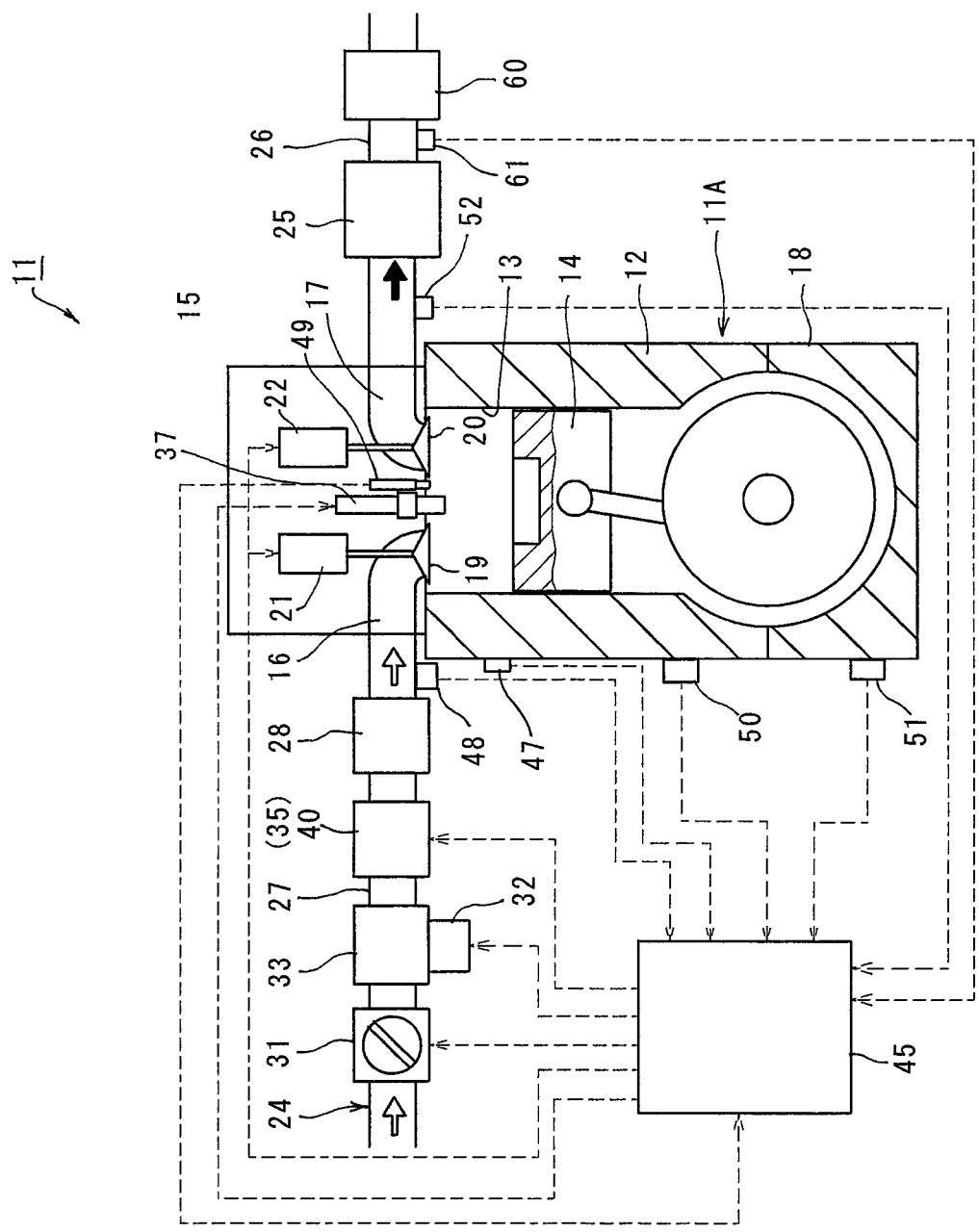
FIG. 1 is a sectional view schematically showing a homogeneous charge compressed ignition engine according to an embodiment of the invention.
Figure 2:
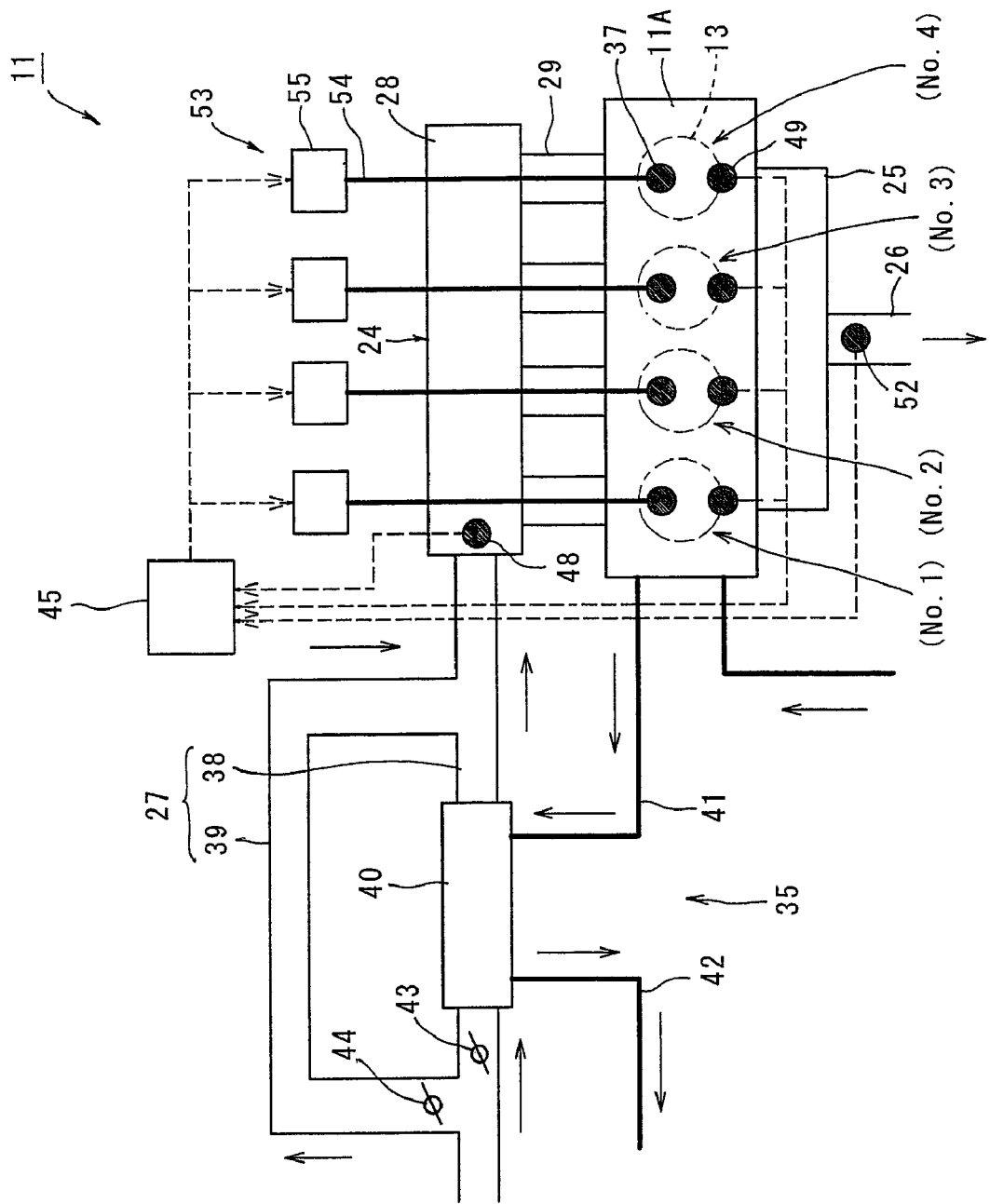
FIG. 2 is a plan view schematically showing the homogeneous charge compressed ignition engine.

FIG. 1 is a sectional view schematically showing a homogeneous charge compressed ignition engine 11 according to an embodiment of the invention, and FIG. 2 is a plan view schematically showing the homogeneous charge compressed ignition engine 11. The homogeneous charge compressed ignition engine 11 of the embodiment is a four-cylinder (No. 1 to No. 4) four-cycle engine, and the homogeneous charge compressed ignition engine 11 has an engine body 11A including a cylinder block 12, a cylinder head 15, and a crankcase 18. A plurality of (four) cylinders 13 are provided in the cylinder block 12, and a piston 14 is slidably fitted in each cylinder 13. An intake port 16 and an exhaust port 17 are provided in the cylinder head 15. The intake port 16 and the exhaust port 17 are opened and closed by an intake valve 19 and an exhaust valve 20, respectively. The intake valve 19 and the exhaust valve 20 are driven by valve mechanisms 21 and 22.

An intake pipe 24 is connected to the intake port 16, and an exhaust pipe 26 including an exhaust manifold 25 is connected to the exhaust port 17. As shown in FIG. 2, the intake pipe 24 includes a main intake pipe 27, an intake surge tank 28 connected to the main intake pipe 27, and a plurality of branched intake pipes 29 each of which is connected to the cylinder 13 from the intake surge tank 28.

As shown in FIG. 1, a throttle valve 31, a mixer 33, and a heating device (temperature controller) 35 are provided in the main intake pipe 27. A flow rate of air introduced into the main intake pipe 27 is adjusted by the throttle valve 31, and a mixer 33 mixes the air and the fuel supplied through a fuel control valve (A/F valve) 32. A ratio of the fuel and the air, that is, an air excess ratio is set in the fuel control valve 32.

The heating device 35 heats the mixture gas of the air and the fuel, the mixture gas flows into the intake surge tank 28, and the mixture gas is taken in a combustion chamber of each cylinder 13 from each branched intake pipe 29 through the intake port 16 (intake stroke). The mixture gas supplied into the combustion chamber in the intake stroke is compressed in a compression stroke, and the mixture gas is self-ignited when the piston 14 reaches a neighborhood of a top dead center, thereby pressing down the piston 14 (expansion stroke). The combustion gas is emitted from the exhaust port 17 through the exhaust pipe 26 in an exhaust stroke.

As shown in FIG. 2, the heating device 35 includes a heat exchanger 40 which is provided in a route 38. The route 38 is one of the main intake pipes 27 divided into two routes. In the heat exchanger 40, engine cooling water is used as a heat exchange medium. In the heat exchanger 40, the cooling water circulating the cylinder block 12 and the cylinder head 15 (FIG. 1) is supplied to the heat exchanger 40 through a channel 41, and the cooling water is returned to a cooler (not shown) through a channel 42. Metering valves 43 and 44 are provided in the routes 38 and 39 of the main intake pipe 27, respectively.

The heat exchanger 40 is not provided in the route 39 of the main intake pipe 27, but the mixture gas passed through the route 39 is directly introduced to the intake surge tank 28 while the mixture gas is not heated. The metering valves 43 and 44 controls (including stop) a flow of the mixture gas into the routes 38 and 39 of the main intake pipe 27. For example, only the metering valve 43 is opened to pass the mixture gas through the route 38, which allow the mixture gas to be rapidly heated. For example, only the metering valve 44 is opened to pass the mixture gas through the route 39, which allow the mixture gas not to be heated (relatively cooled). The metering valves 43 and 44 are opened to mix the heated mixture gas and the unheated mixture gas, which allows the temperature to be finely controlled.

A lubricant and exhaust gas can be used as a heat exchange medium of the heating device 35. An electric heater can be used as the heating device 35. The main intake pipe 27 is not branched as described above, but the heating device 35 can be provided into one route.

As shown in FIG. 1, the engine 11 includes a controller 45. The controller 45 controls the throttle valve 31, the fuel control valve 32, the heating device 35, and the like. A cooling water temperature sensor 47, an intake air temperature sensor 48, an in-cylinder pressure sensor 49, an engine speed sensor 50, a torque sensor 51, an air excess ratio sensor 52, and the like are provided in the engine 11. Detection signals of various sensors are fed into the controller 45.

In the embodiment, the in-cylinder pressure sensor 49 detects a pressure in each cylinder 13, and the detection value is analyzed to obtain a combustion mass rate. The compression ignition timing is set at a time the combustion mass rate becomes 50%.

An ignition plug 37 is provided in the cylinder head 15 of the engine 11. As shown in FIG. 2, the ignition plug 37 is connected to an ignition coil 55 through high-tension cord 54, and the ignition plug 37, the high-tension cord 54, and the ignition coil 55 constitute a spark ignition device 53. The controller 45 controls energization of the ignition coil 55 of the spark ignition device 53.

[Homogeneous Charge Compressed Ignition Engine Operating Method]

Originally, in the homogeneous charge compressed ignition engine 11, the operation is performed by the homogeneous charge compressed ignition (HCCI) with no use of spark ignition. However, in the homogeneous charge compressed ignition engine 11 of the embodiment, the spark ignition is used in starting the engine 11 and in a transition operation until the compression ignition operation is performed since the engine 11 is started.

In the engine starting, the operation is a so-called spark ignition operation (SI operation) in which the mixture gas is burned by the spark ignition. In the transition operation, the spark ignition operation is not performed, but the compression ignition operation is performed while the spark ignition device 53 is supplementarily used. In the description, the transition operation is referred to as spark-assist compression ignition operation, and the original compression ignition operation in which the spark ignition is not used is referred to as non-spark compression ignition operation.

The spark-assist compression ignition operation is one in which the compression ignition is induced by the spark ignition on an operating condition that the non-spark compression ignition operation is hardly performed, and the spark-assist compression ignition operation is one in which the mixture gas in a compressed state by a spark of the spark ignition or propagation flame after ignition is self-ignited by the spark ignition.

Figure 3:
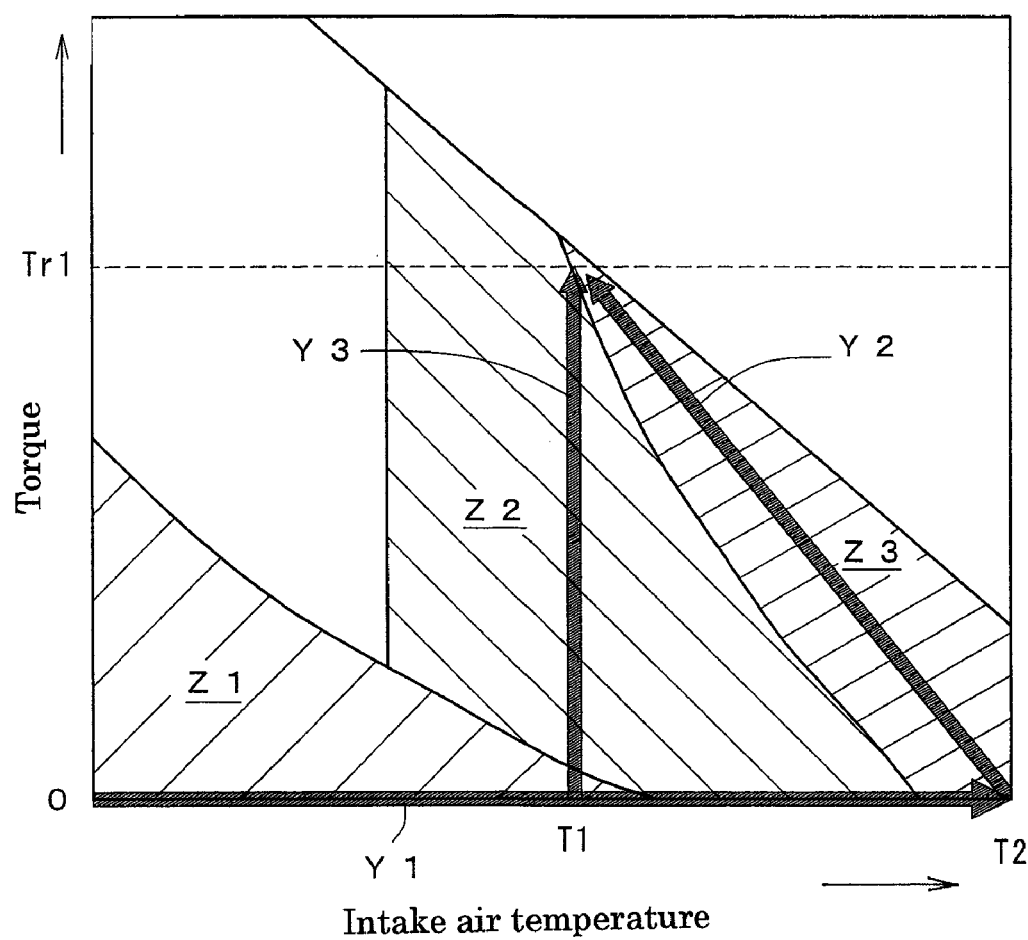
FIG. 3 is a graph showing operation ranges where a spark ignition operation, a spark-assist compression ignition operation, and a non-spark compression ignition operation can be performed in terms of a relationship between a torque of the homogeneous charge compressed ignition engine and an intake air temperature.

FIG. 3 is a graph showing operation ranges where the spark ignition operation, the spark-assist compression ignition operation, and the non-spark compression ignition operation can be performed in terms of a relationship between a torque of the homogeneous charge compressed ignition engine 11 and an intake air temperature. The numeral Z1 designates a range where the spark ignition operation can be performed, the numeral Z2 designates a range where the spark-assist compression ignition operation can be performed, and the numeral Z3 designates a range where the non-spark compression ignition operation can be performed. In the embodiment, the spark ignition operation (Z1) is performed until the intake air temperature is raised to a certain extent. When the intake air temperature is raised to a predetermined temperature T1, the spark ignition operation (Z1) is transferred to the spark-assist compression ignition operation (Z2) as shown by the arrow Y3 while the intake air temperature is maintained. Then the non-spark compression ignition operation (Z3) is performed. The embodiment will be described in detail below.

In starting the engine 11, the engine 11 is in a cold state and obviously the intake air temperature is lowered. Accordingly, the spark-assist compression ignition operation (Z2) and the non-spark compression ignition operation (Z1) are hardly performed. Therefore, the spark ignition operation in which the mixture gas is burned by the spark ignition is performed as shown in the range Z1. At this point, an air excess ratio is set lower (fuel rich) using the fuel control valve 32 (FIG. 1). Because an engine cooling water temperature is gradually raised when the spark ignition operation is performed, the intake air temperature can be raised by the heating device 35 (FIG. 2).

The intake air temperature is maintained at the temperature T1 by the heating device 35, when the intake air temperature reaches the temperature T1 at which a maximum torque Tr1 can be generated by the non-spark compression ignition operation (Z3). Then the load is fed to make the transition from the spark ignition operation (Z1) to the spark-assist compression ignition operation (Z2). At this point, the air excess ratio is gradually increased by the fuel control valve 32 (fuel lean). When the torque is brought close to the maximum torque Tr1 to enter the range Z3, the spark ignition is stopped to make the transition to the non-spark compression ignition operation.

Figure 4:
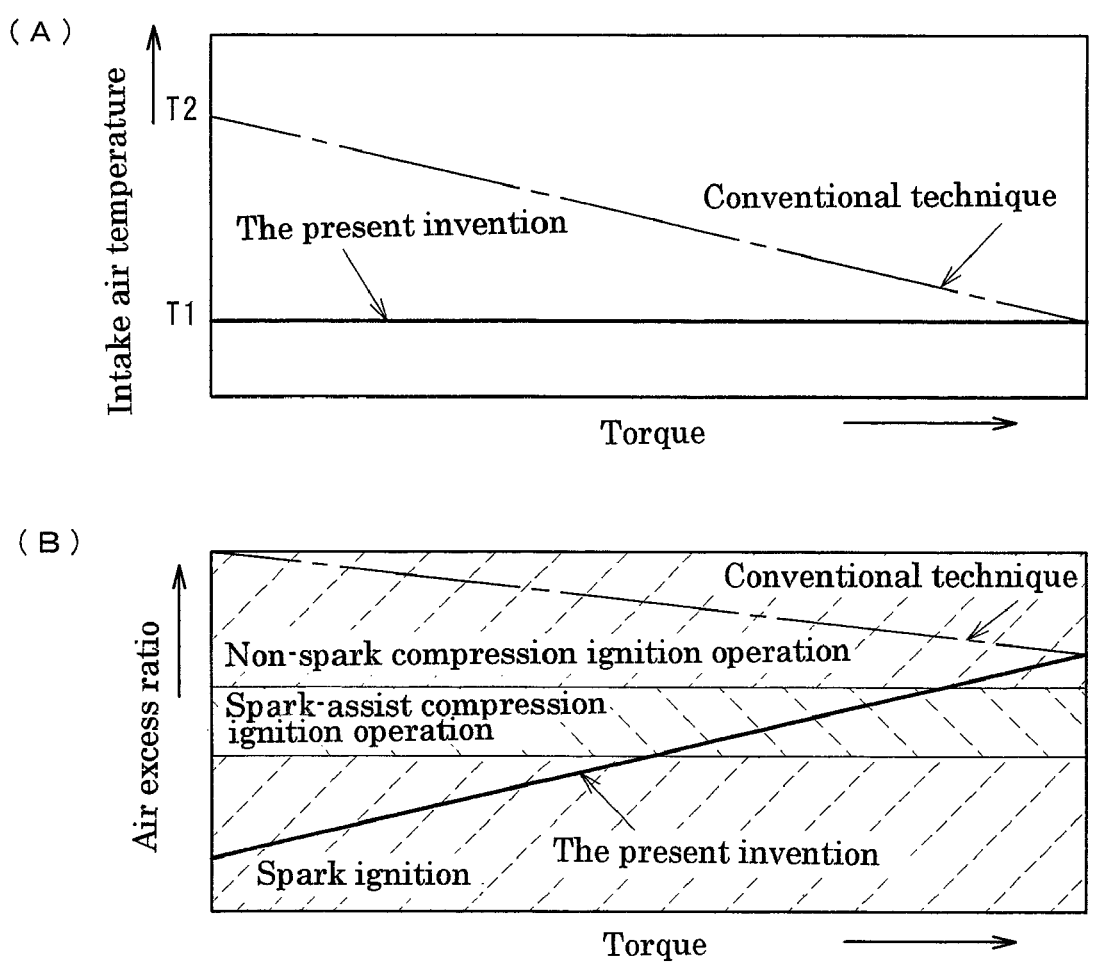
FIG. 4(A) is a graph showing a relationship between a torque and an intake air temperature.
FIG. 4(B) is a graph showing a relationship between a torque and an air excess ratio.

FIG. 4(A) is a graph showing a relationship between the torque and the intake air temperature, and FIG. 4(B) is a graph showing a relationship between the torque and an air excess ratio. The invention is indicated by a solid line, and the conventional technique (the case where the spark-assist compression ignition operation is not performed, but the non-spark compression ignition operation is performed on the condition indicated by an arrow Y2 of FIG. 3) is indicated by an alternate long and short dash line.

In the embodiment, the air excess ratio is gradually increased while the intake air temperature is maintained at the temperature T1, the spark ignition operation is transferred to the non-spark compression ignition operation through the spark-assist compression ignition operation. On the other hand, in the conventional technique, the throttle valve is fully opened while the intake air temperature is gradually lowered from a temperature T2 to the temperature T1, and the air excess ratio is gradually decreased to perform the non-spark compression ignition operation.

Accordingly, in the embodiment, the intake air temperature is not changed between the temperature T2 and the temperature T1 unlike the conventional technique, so that the torque can be increased with no time necessary to change the intake air temperature.

In the case where the load is cut off to decrease the torque from the maximum torque state, the operation is performed through the reversal process of the arrow Y3 of FIG. 3. That is, the non-spark compression ignition operation (Z3) is transferred to the spark ignition operation (Z1) through the spark-assist compression ignition operation (Z2). In such cases, the load can quickly be cut off because the intake air temperature is substantially kept constant.

Figure 5:
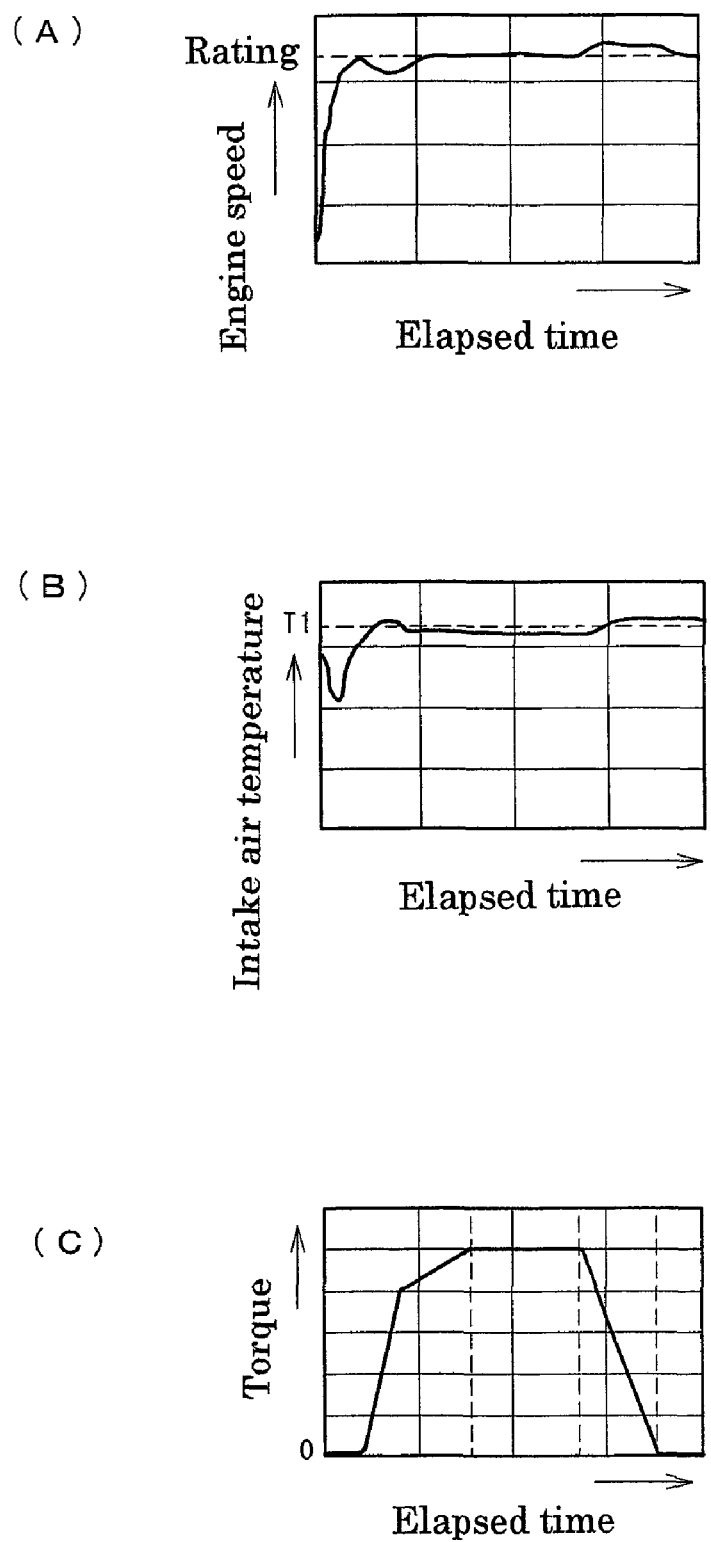
FIG. 5(A) is a graph showing a change in engine speed as time advances when the engine is started from a warm state.
FIG. 5(B) is a graph showing a change in intake air temperature as time advances when the engine is started from the warm state.
FIG. 5(C) is a graph showing a change in torque in load input as time advances when the engine is started from the warm state.

FIG. 5(A) is a graph showing a change in engine speed as time advances when the engine 11 is started from the warm state in an experiment, FIG. 5(B) is a graph showing a change in intake air temperature as time advances when the engine 11 is started from the warm state in an experiment, and FIG. 5(C) is a graph showing a change in torque in load input as time advances when the engine 11 is started from the warm state in an experiment. In FIGS. 5(A) and 5(B), the engine speed is shortly raised to a neighborhood of a rating from the engine starting, and the intake air temperature is maintained at the temperature T1 from the substantially same timing. In FIG. 5(C), the torque can shortly be increased from when the engine speed and the intake air temperature are substantially kept constant. The time the torque becomes zero (idling state) since the load is cut off can also be shortened.

In performing the spark-assist compression ignition operation or the non-spark compression ignition operation, the opening of the fuel control valve 32 can be kept constant.

(Adjustment of Compression Ignition Timing in Spark-Assist Compression Ignition Operation)

Figure 6:
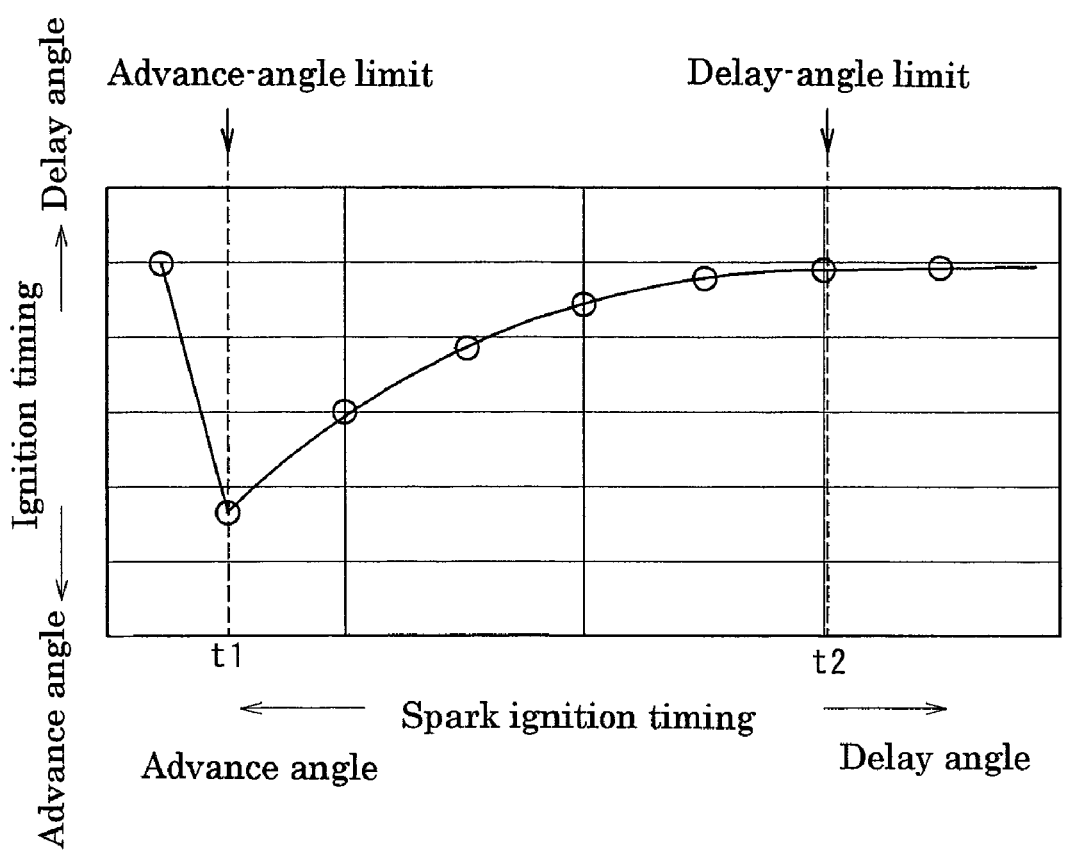
FIG. 6 is a graph showing a relationship between spark ignition timing and compression ignition timing when the spark-assist compression ignition operation is performed.

FIG. 6 is a graph showing a relationship between spark ignition timing and compression ignition timing when the spark-assist compression ignition operation is performed. As can be seen from FIG. 6, when the spark ignition timing is delayed from an advance-angle side toward a delay-angle side, the compression ignition timing is also delayed from the advance-angle side toward the delay-angle side.

In the embodiment, the adjustment of the compression ignition timing is performed by adjusting the spark ignition timing.

Additionally, as can be seen from FIG. 6, when the spark ignition timing is located on the advance-angle side from certain timing t1, the compression ignition timing is not substantially advanced even if the spark ignition timing is further advanced. On the contrary, when the spark ignition timing is located on the delay-angle side from certain timing t2, the compression ignition timing is not substantially delayed even if the spark ignition timing is further delayed. This is attributed to the fact that the compression ignition is already naturally started.

In the embodiment, attention also focuses on the above-described characteristic, the timing t1 is set at limit timing (advance-angle limit) on the advance-angle side of the spark ignition while the timing t2 is set at limit timing (delay-angle limit) on the delay-angle side, and the operation of the spark ignition device 53 (FIG. 2) is controlled such that the spark ignition is performed between the limit timing t1 and the limit timing t2. Therefore, the compression ignition can securely be induced by performing the spark ignition.

The spark ignition timing can be adjusted by the following method. That is, the controller 45 controls the energization of the spark ignition device 53 of FIG. 2 to the ignition coil 55.

For example, the target compression ignition timing is previously set such that a balance can be established in the thermal efficiency, an emission amount of air-pollution substance (hazardous component) contained in the exhaust gas, and the like. The actual compression ignition timing is obtained from the detection value of the in-cylinder pressure sensor 49 (FIG. 1) as described above. The target compression ignition timing and the actual compression ignition timing are compared to each other, and the spark ignition timing is adjusted based on the comparison such that the actual compression ignition timing is matched with the target compression ignition timing. That is, the spark ignition timing is fed back from the comparison between the target compression ignition timing and the actual compression ignition timing.

Figure 7:
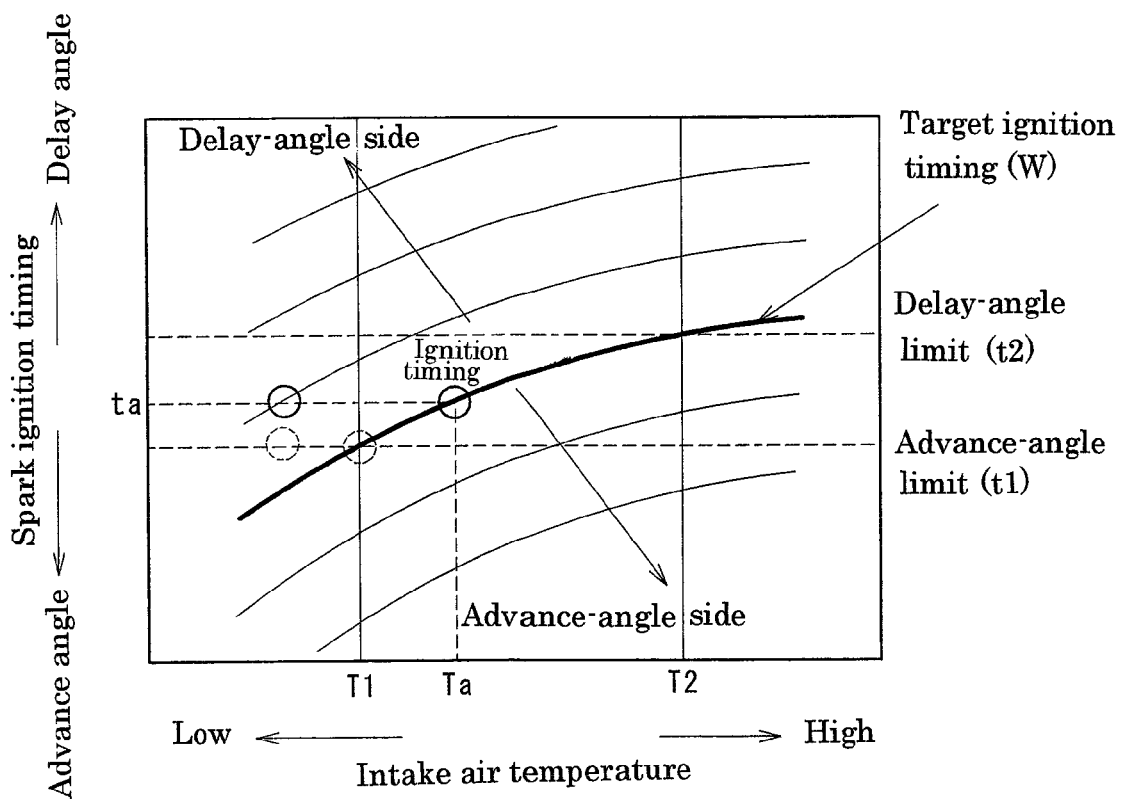
FIG. 7 is a graph showing a change in compression ignition timing in terms of a relationship between the spark ignition timing and the intake air temperature.

FIG. 7 is a graph showing a change in compression ignition timing in terms of the relationship between the spark ignition timing and the intake air temperature. In the graph of FIG. 7, the letter W designates the target compression ignition timing (for example, timing at a crank angle of TDC+6°). As can be seen from the graph of FIG. 7, when the spark ignition timing is adjusted to ta at the intake air temperature Ta, the actual compression ignition timing can be adjusted to the target compression ignition timing.

NOx which is of the air-pollution substance tends to be increased when the ignition timing is early, and THC (unburned hydrocarbon) or CO (carbon monoxide) tends to be increased when the ignition timing is late, so that the target compression ignition can be set at the timing in which the emission amounts of the air-pollution substances are reduced with a proper balance.

In the case of the plural-cylinder engine 11 of the embodiment, the compression ignition timing depends on a difference of a compression-end temperature caused by a difference of the heat radiation property of each cylinder. Accordingly, the compression ignition can be timed in the cylinders by adjusting the spark ignition timing of each cylinder. When the compression ignition is timed in the cylinders, the cycle efficiency and the thermal efficiency can be enhanced.

(Exception of Adjustment of Compression Ignition Timing)

Referring to FIG. 3, in the arrow Y3, in the state in which the torque is small (load is small) immediately after the spark ignition operation (Z1) is transferred to the spark-assist compression ignition operation (Z2), the in-cylinder pressure sensor 49 (FIG. 1) hardly detects the pressure due to a high noise ratio. Accordingly, the combustion mass rate (that is, compression ignition timing) cannot correctly be obtained from the detection value. Therefore, when the feedback control is performed as described above, possibly the stable operation is disturbed. Particularly, when the load feed is started, the spark ignition timing advanced to the advance-angle limit t1 to easily generate the knocking.

Therefore, when the load is not more than a predetermined value (that is, in the embodiment, the air excess ratio is not more than a predetermined value as shown in FIG. 4(B)), the feedback control is not performed, but the operation stability is ensured by performing designed control in which the following map is used.

A spark ignition timing map is produced and stored in a memory (not shown) of the controller 45. In the spark ignition timing map, the spark ignition timing at which the target compression ignition timing can be realized is mapped in terms of the relationship with operating conditions such as the intake air temperature. The operating state is detected, the spark ignition timing corresponding to the detection value is selected by referring to the spark ignition timing map, and the spark ignition device 53 is controlled such that the spark ignition is performed at the spark ignition timing.

The designed control can stably perform the compression ignition timing control (spark ignition timing control) even in the low load.

(Method for Performing Warm-Up from Cold State)

As described above, in FIGS. 3 and 4, the load is fed from the state in which the intake air temperature is raised to the temperature T1, so that the time to cutoff can be shortened. The shortening of the time until the intake air temperature reaches the temperature T1 since the engine 11 is started from the cold state by the spark ignition operation or the time until the spark-assist compression ignition operation can be performed will be described below.

Figure 8:
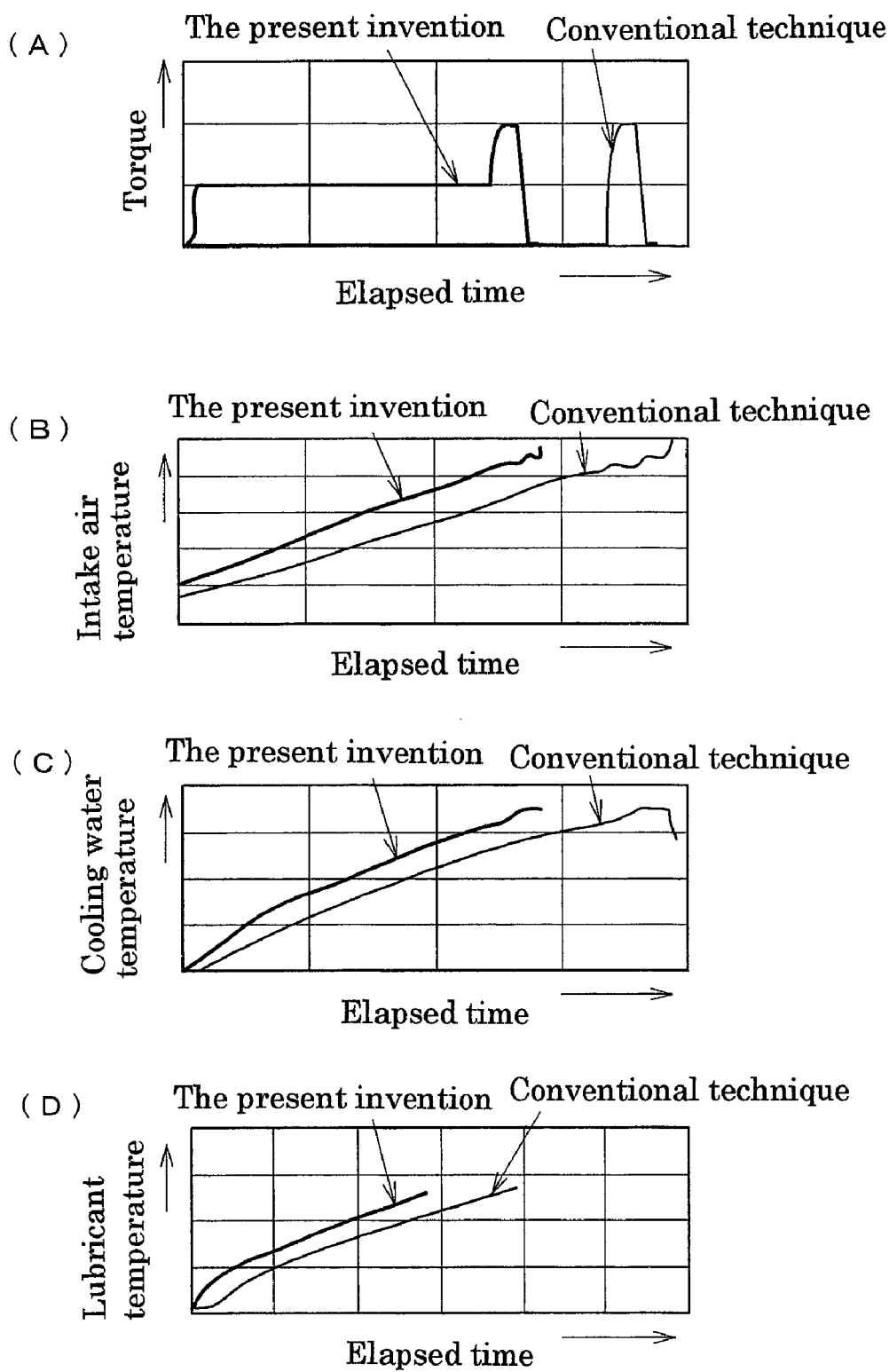
FIG. 8(A) is a graph showing a fluctuation in torque as time advances when the engine is started from a cold state.
FIG. 8(B) is a graph showing a change in intake air temperature as time advances when the engine is started from the cold state.
FIG. 8(C) is a graph showing a change in cooling water temperature as time advances when the engine is started from the cold state.
FIG. 8(D) is a graph showing a change in lubricant temperature as time advances when the engine is started from the cold state.

FIG. 8(A) is a graph showing a change in torque as time advances when the engine 11 is started from the cold state, FIG. 8(B) is a graph showing a change in intake air temperature as time advances when the engine 11 is started from the cold state, FIG. 8(C) is a graph showing a change in cooling water temperature as time advances when the engine 11 is started from the cold state, and FIG. 8(D) is a graph showing a change in lubricant temperature as time advances when the engine 11 is started from the cold state. The conventional technique is simultaneously shown for the purpose of comparison.

As shown in FIG. 8(A), in the conventional technique, the operation is performed while the load is not applied (torque is set at zero) soon after the starting. Therefore, as shown in FIGS. 8(C) and 8(D), the cooling water temperature and the lubricant temperature are gradually raised. As shown in FIG. 8(B), the intake air temperature is also raised by the heating device 35 (FIG. 2) as the cooling water temperature is raised. As shown in FIG. 8(A), the load is applied after a while from the starting such that the torque is maximized. On the other hand, in the present invention, the load is fed soon after the engine starting, and the operation is performed with the torque generated smaller than the maximum torque (in FIG. 8(A), about a half). Therefore, as can be seen from FIGS. 8(B) to 8(D), the intake air temperature, the cooling water temperature, and the lubricant temperature are raised earlier than the conventional technique. As shown in FIG. 8(A), the maximum load can be applied earlier than the conventional technique.

In the embodiment, because the load is fed soon after the engine starting, the opening of the fuel control valve 32 (FIG. 1) is adjusted to decrease the air excess ratio (fuel rich), and the opening of the throttle valve 31 (FIG. 1) is decreased according to the adjusting opening of the fuel control valve 32 such that the knocking is not generated. The magnitude of the load is set at the maximum load at which the knocking is not generated. Then, in order to maintain the operating state in which the load is applied, the air excess ratio is increased to a value in which the compression ignition can be performed, while the fuel control valve and the throttle valve opening are appropriately adjusted as time progresses.

Figure 9:
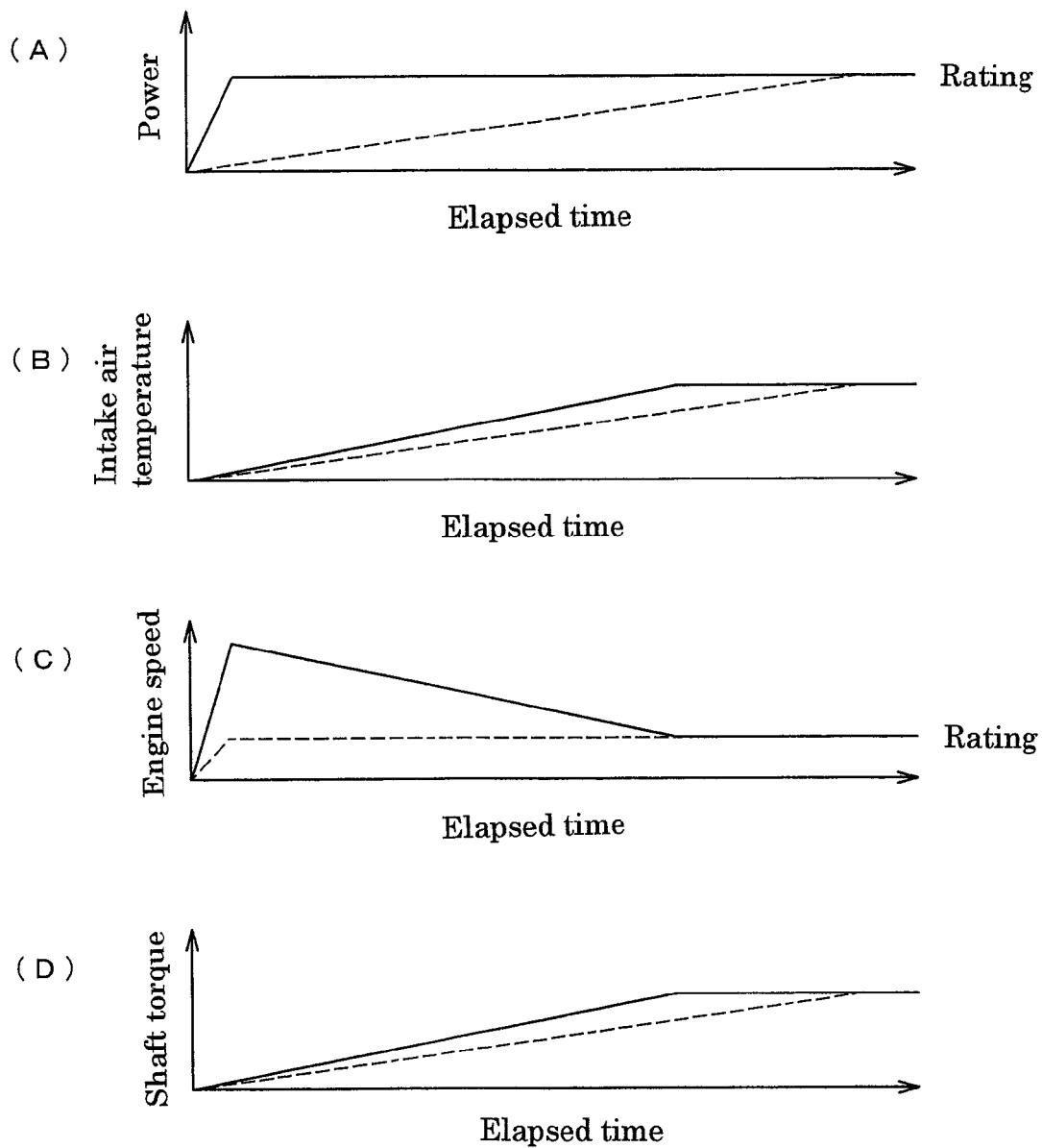
FIG. 9(A) is a graph showing a change in power as time advances when the engine is started from the cold state.
FIG. 9(B) is a graph showing a change in intake air temperature as time advances when the engine is started from the cold state.
FIG. 9(C) is a graph showing a change in engine speed as time advances when the engine is started from the cold state.
FIG. 9(D) is a graph showing a change in shaft torque as time advances when the engine is started from the cold state.

In the embodiment, the intake air temperature can be further raised earlier as shown in FIG. 9. FIG. 9(A) is a graph showing a change in power as time advances when the engine 11 is started from the cold state, FIG. 9(B) is a graph showing a change in intake air temperature as time advances when the engine 11 is started from the cold state, FIG. 9(C) is a graph showing a change in engine speed as time advances when the engine 11 is started from the cold state, and FIG. 9(D) is a graph showing a change in shaft torque as time advances when the engine 11 is started from the cold state. The present invention is indicated by the solid line, and the conventional technique is indicated by the dotted line.

In the present invention, soon after the engine starting, the engine speed is raised to the rated speed or more according to the shaft torque, and the power is increased to the rated power. Therefore, it is found that the intake air temperature is raised early. In the case where a generator is driven by the engine 11, the power is controlled by an inverter such that a frequency is not fluctuated. The fluctuation in frequency is caused by the factor that the engine speed is raised more than the rating.

(Engine Speed Governing in High Load)

Figure 10:
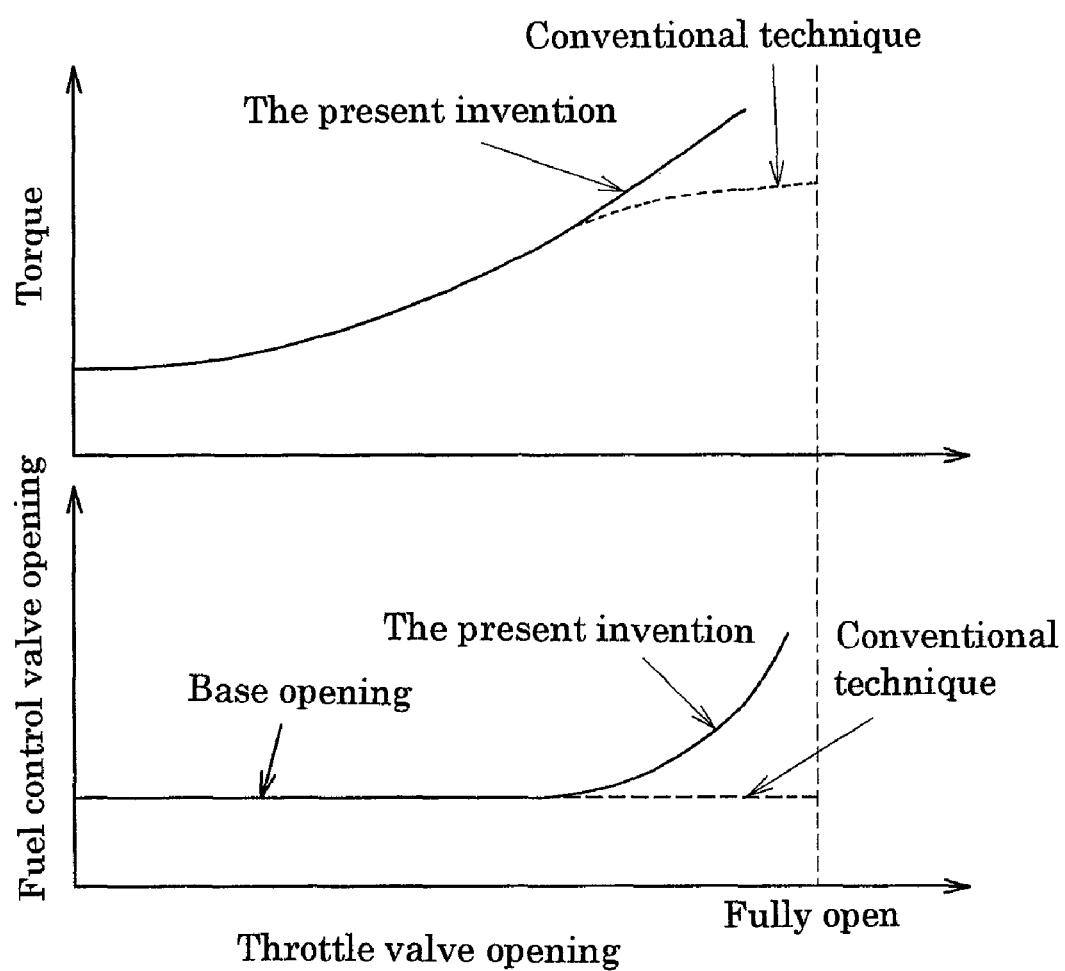
FIG. 10 is a graph showing a change in torque to throttle valve opening and a change in fuel control valve opening to the throttle valve opening.

In performing the spark-assist compression ignition operation and the non-spark compression ignition operation, the load is increased while the opening of the fuel control valve 32 (FIG. 1) is kept constant, and the opening of the throttle valve 31 (FIG. 1) is increased, which allows the engine speed to be governed constant. In this case, FIG. 10 is a graph showing a change in torque to opening of the throttle valve 31 and a change in opening of the fuel control valve 32 to the opening of the throttle valve 31. The present invention is indicated by the solid line, and the conventional technique is indicated by the alternate long and two dashes line. As can be seen from FIG. 10, in the conventional technique, the torque (power) is not increased too much even if the throttle valve 31 is opened in the high load range. Therefore, the high load cannot be fed.

On the other hand, in the present invention, when the opening of the throttle valve 31 is not lower than a predetermined value, the fuel control valve 32 is adjusted from the constant state toward a direction in which the fuel control valve 32 is opened. Therefore, the torque can be increased.

At this point, the fuel control valve 32 is controlled as follows. A map is produced and stored in the memory of the controller 45. In the map, the increased opening of the fuel control valve 32 is previously set according to the increased opening of the throttle valve 31 when the throttle valve 31 is opened not lower than the predetermined value. When the throttle valve 31 is opened not lower than the predetermined value, the increased opening of the fuel control valve 32 is selected by referring to the map from the increased opening of the throttle valve 31, and the controller 45 opens the fuel control valve 32.

Figure 11:
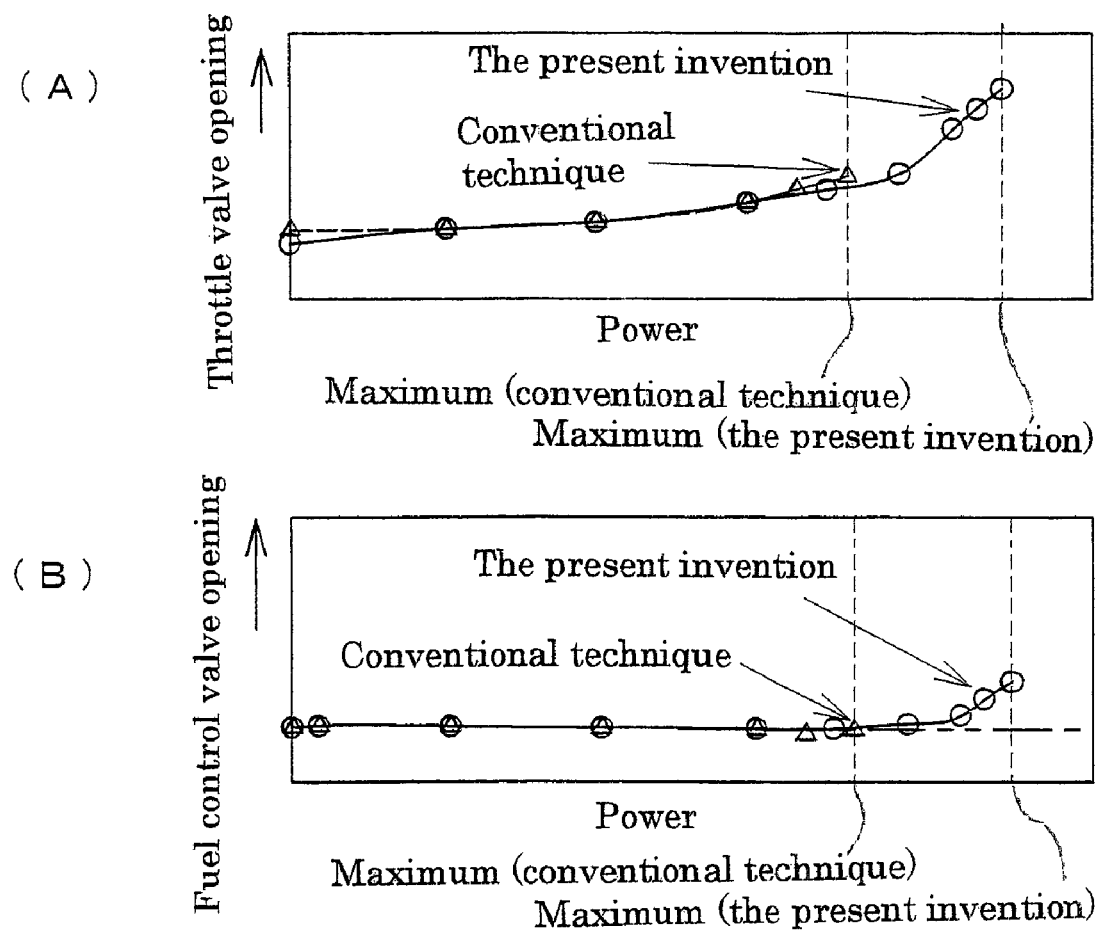
FIG. 11(A) is a graph showing a relationship between power and throttle valve opening.
FIG. 11(B) is a graph showing a relationship between power and a fuel control valve.

FIG. 11(A) is a graph showing the relationship between the power and the opening of the throttle valve 31 in the above case, and FIG. 11(B) is a graph showing the relationship between the power and the opening of the fuel control valve 32 in the above case.

As can also be seen from FIGS. 11(A) and 11(B), when the throttle valve 31 is opened not lower than the predetermined value, the fuel control valve 32 is opened to increase the power.

(Improvement of Exhaust Gas Catalytic Conversion Efficiency)

Figure 12:
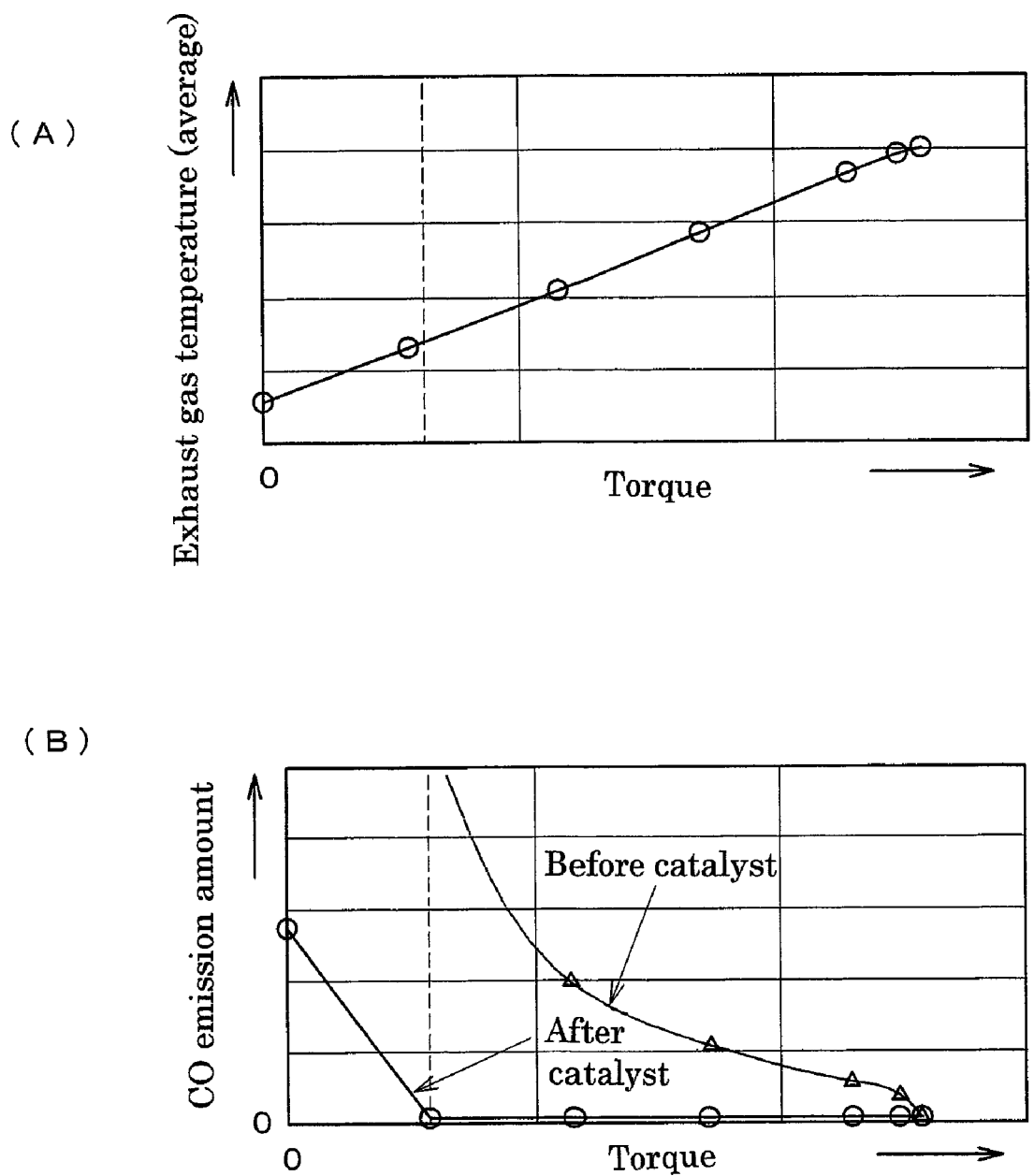
FIG. 12(A) is a graph showing a relationship between a torque and an exhaust gas temperature.
FIG. 12(B) is a graph showing a relationship between a torque and a CO emission amount.

As shown in FIG. 1, the exhaust gas catalyst 60 is provided in the exhaust pipe 26 in order to purify the air-pollution substance contained in the exhaust gas. Generally, as shown in FIG. 12(A), the exhaust gas temperature is raised as the torque is increased. On the other hand, as shown in FIG. 12(B), the CO emission amount contained in the exhaust gas is gradually decreased as the torque is increased before the exhaust gas passes through the catalyst. After the exhaust gas passes through the catalyst, the CO emission amount is decreased near zero in the high torque range, while the CO emission amount is not decreased too much in the low torque range, that is, the range where the exhaust gas temperature is lowered.

In view of the foregoing, in the embodiment, the air-pollution substance purification performed by the catalyst is promoted by raising the exhaust gas temperature in the low torque range. Specifically, the following method is adopted according to the engine speed governing method.

(1) The Case Where the Engine Speed is Governed by the Fuel Control Valve 32 (FIG. 1)

As shown in FIG. 1, the exhaust gas temperature sensor 61 is provided in the exhaust pipe 26 in order to detect the exhaust gas temperature, and the throttle valve 31 is adjusted toward the direction the throttle valve 31 is closed when a value detected by the exhaust gas temperature sensor 61 is lower than a predetermined limit temperature due to the low load. When the throttle valve 31 is adjusted toward the direction the throttle valve 31 is closed, although the actual fuel supply amount is decreased, the fuel control valve 32 is adjusted toward the direction the fuel control valve 32 is opened such that the decreased fuel supply amount is covered to maintain the engine speed. When the fuel control valve 32 is adjusted toward the direction the fuel control valve 32 is opened, the exhaust gas temperature is raised because the air excess ratio is decreased. Accordingly, the catalytic conversion efficiency can be enhanced for the air-pollution substance even in the low load.

Figure 13:
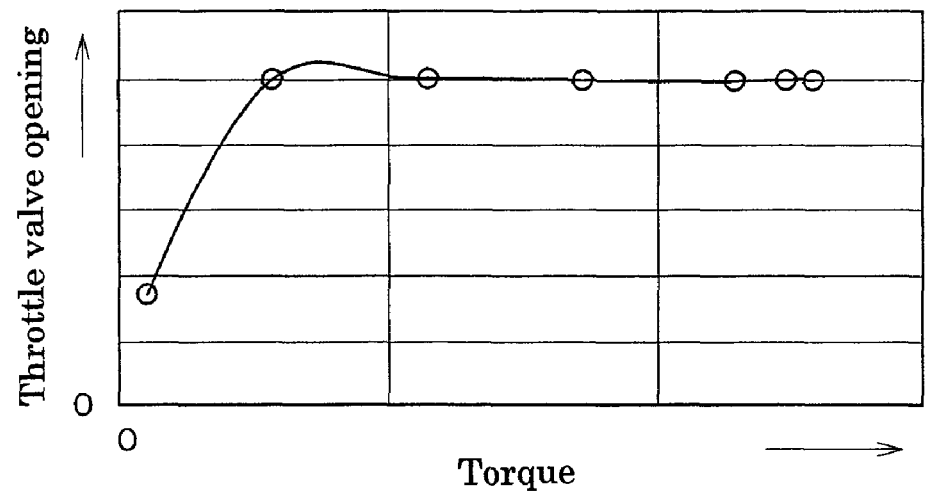
FIG. 13(A) is a graph showing a relationship between a torque and throttle valve opening.
FIG. 13(B) is a graph showing a relationship between a torque and fuel control valve opening.
Figure 13:
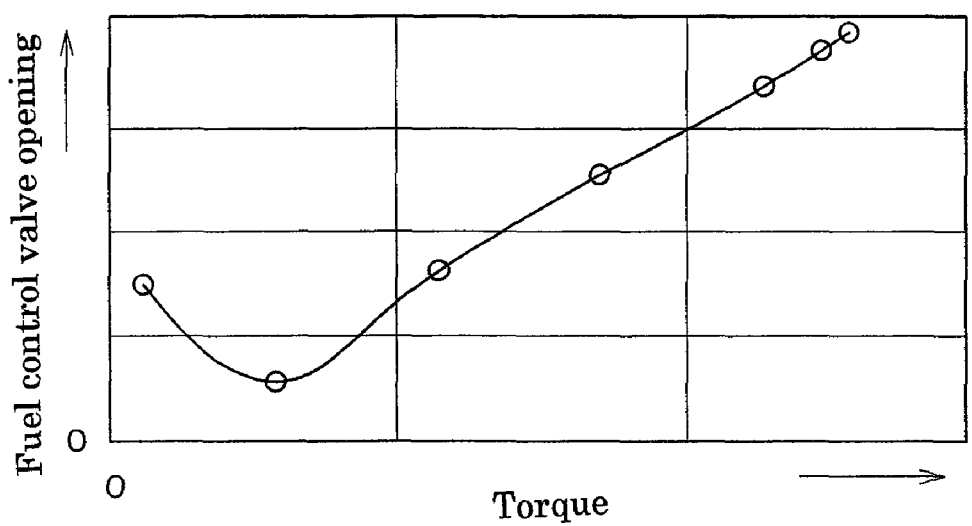
Figure 14:
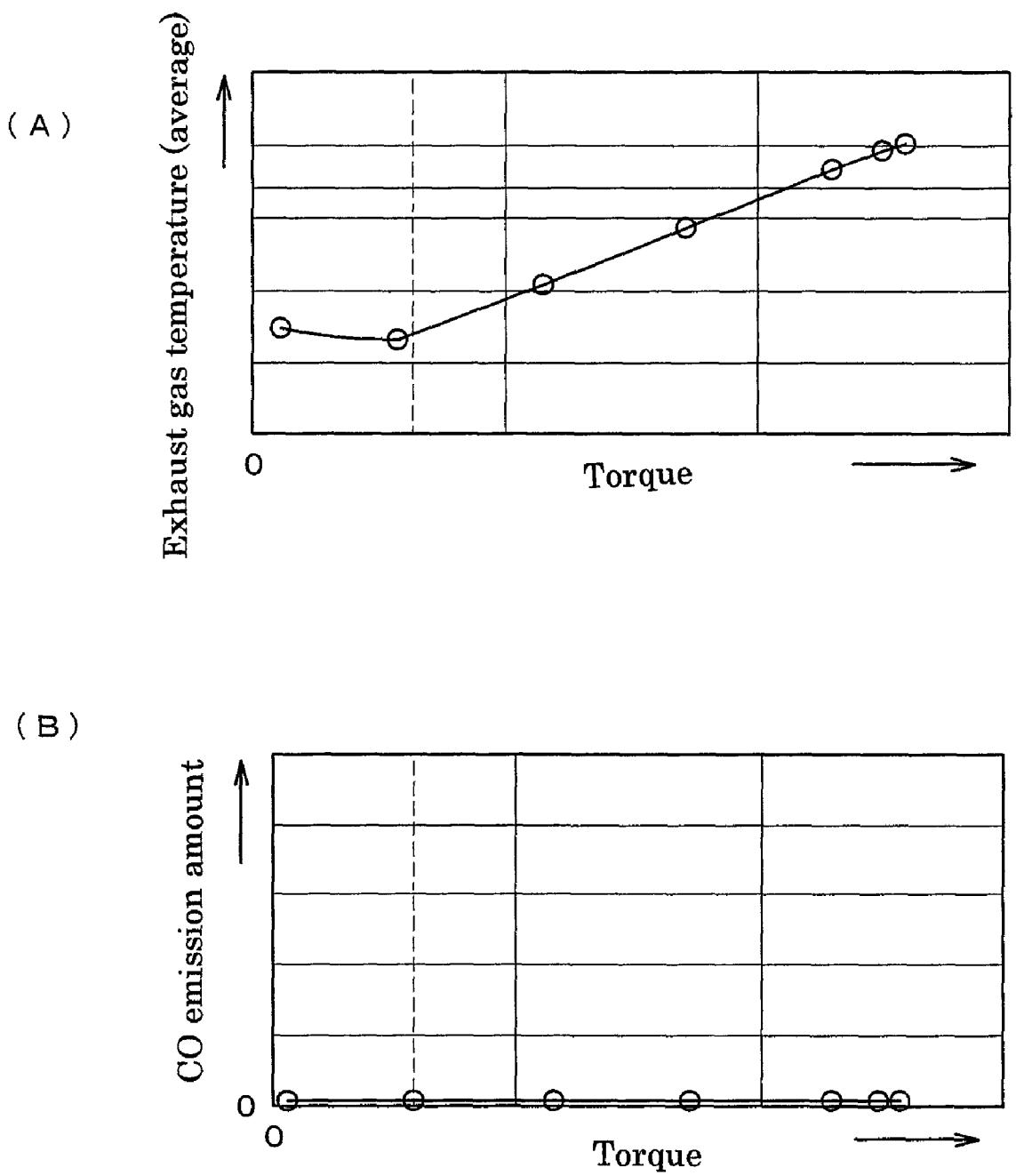
FIG. 14(A) is a graph showing a relationship between a torque and an exhaust gas temperature.
FIG. 14(B) is a graph showing a relationship between a torque and a CO emission amount after exhaust gas passes through a catalyst.

FIG. 13(A) is a graph showing the relationship between the torque and the throttle valve opening when the control (1) is performed, and FIG. 13(B) is a graph showing the relationship between the torque and the opening of the fuel control valve 32 when the control (1) is performed. FIG. 14(A) is a graph showing the relationship between the torque and the exhaust gas temperature when the control (1) is performed, and FIG. 14(B) is a graph showing the relationship between the torque and the CO emission amount after the exhaust gas passes through the catalyst when the control (1) is performed. As can be seen from the graphs of FIGS. 13 and 14, the control method is effective.

(2) The Case Where the Engine Speed is Governed by the Throttle Valve

The fuel control valve 32 is adjusted toward the direction the fuel control valve 32 is opened when the value detected by the exhaust gas temperature sensor 61 is lower than the predetermined limit temperature due to the low load. When the fuel control valve 32 is adjusted toward the direction the fuel control valve 32 is opened, the exhaust gas temperature is raised because the air excess ratio is decreased. Therefore, the catalytic conversion efficiency can be enhanced for the air-pollution substance. The throttle valve 31 is adjusted toward the direction the throttle valve 31 is closed such that the actual fuel supply amount is not increased even if the air excess ratio is decreased, thereby maintaining the engine speed.

The result shown in FIG. 14 can be obtained by performing the control (2).

The invention is not limited to the embodiment, but the design can appropriately be changed. For example, although the four-cylinder homogeneous charge compressed ignition engine 11 is illustrated in the embodiment, the number of cylinders is not particularly limited.

The invention claimed is:

1. A homogeneous charge compressed ignition engine operating method in which a mixture gas is burned by compression ignition in a combustion chamber, fuel and air being previously mixed to produce the mixture gas,
   wherein the homogeneous charge compressed ignition engine includes a spark ignition device which performs spark ignition to the mixture gas,
   a temperature controller substantially keeps an intake air temperature of the mixture gas constant, and
   a spark ignition operation, a spark-assist compression ignition operation, and a non-spark compression ignition operation are switched according to magnitude of a load, spark ignition being supplementarily used in the spark-assist compression ignition operation, the spark ignition being not used in the non-spark compression ignition operation.

2. The homogeneous charge compressed ignition engine operating method according to claim 1, wherein
   in the spark-assist compression ignition operation,
   target compression ignition timing is previously set, a spark ignition timing map is previously provided, spark ignition timing at which the target compression ignition timing can be realized being recorded in the spark ignition timing map, the spark ignition is performed at the spark ignition timing after engine starting when the load is not more than a predetermined value, the spark ignition timing being selected from an operating condition by referring to the spark ignition timing map, and when the load is not lower than the predetermined value, the target compression ignition timing and actual compression ignition timing are compared to each other, and the spark ignition timing is adjusted based on the comparison such that the actual compression ignition timing is matched with the target compression ignition timing.

3. The homogeneous charge compressed ignition engine operating method according to claim 1, wherein an air excess ratio is lowered to perform the spark ignition operation immediately after the engine is started from a cold state.

4. The homogeneous charge compressed ignition engine operating method according to claim 3, wherein an engine speed is raised to a rated speed or more such that engine power becomes rating, immediately after the engine is started from the cold state.

5. The homogeneous charge compressed ignition engine operating method according to claim 1, wherein throttle valve opening is adjusted to maintain an engine speed in performing the spark-assist compression ignition operation and the non-spark compression ignition operation, and an air excess ratio is lowered according to the throttle valve opening when the throttle valve opening is not lower than a predetermined value.

6. The homogeneous charge compressed ignition engine operating method according to claim 1, wherein a catalyst is provided in an exhaust passage of the engine in order to purify a hazardous component contained in exhaust gas, and a mixture gas flow rate is decreased while an air excess ratio is lowered in order that an exhaust gas temperature is raised while an engine speed is maintained, when the engine is in a low load state, or when the exhaust gas temperature is lower than a predetermined value.

\* \* \* \* \*